(12) United States Patent
Thiessen

(10) Patent No.: US 9,302,604 B2
(45) Date of Patent: Apr. 5, 2016

(54) MODULAR HOPPER UNIT FOR BULK MATERIAL TRANSPORT TRUCK OR TRAILER

(71) Applicant: Darrel Thiessen, Brandon (CA)

(72) Inventor: Darrel Thiessen, Brandon (CA)

( * ) Notice: Subject to any disclaimer, the term of this patent is extended or adjusted under 35 U.S.C. 154(b) by 93 days.

(21) Appl. No.: 14/269,994

(22) Filed: May 5, 2014

(65) Prior Publication Data

US 2014/0327291 A1 Nov. 6, 2014

Related U.S. Application Data

(60) Provisional application No. 61/819,149, filed on May 3, 2013.

(51) Int. Cl.
*B60P 1/56* (2006.01)
(52) U.S. Cl.
CPC ........................................ *B60P 1/56* (2013.01)
(58) Field of Classification Search
CPC .................................. B60P 1/56; B65D 90/58
USPC ....................................................... 298/24, 27
See application file for complete search history.

(56) References Cited

U.S. PATENT DOCUMENTS

| | | | | |
|---|---|---|---|---|
| 2,142,236 | A * | 1/1939 | Campbell ................... | 105/282.3 |
| 2,171,030 | A * | 8/1939 | Gilson ............................... | 298/7 |
| 2,763,220 | A * | 9/1956 | Becker et al. ................. | 110/192 |
| 3,248,026 | A * | 4/1966 | Kemp ........................... | 406/130 |
| 3,446,538 | A * | 5/1969 | Danielson ..................... | 406/130 |
| 3,709,152 | A * | 1/1973 | Gutridge ....................... | 105/253 |
| 5,417,165 | A * | 5/1995 | Peppin et al. ................. | 105/250 |
| 5,657,700 | A * | 8/1997 | Bounds ....................... | 105/311.1 |
| 5,860,366 | A * | 1/1999 | Lydic ............................ | 105/416 |
| 6,263,803 | B1* | 7/2001 | Dohr et al. ................. | 105/282.3 |
| 6,502,518 | B1* | 1/2003 | Miller ........................... | 105/248 |
| 6,955,127 | B2* | 10/2005 | Taylor .......................... | 105/299 |
| 2002/0011175 | A1* | 1/2002 | Dohr ............................. | 105/247 |
| 2005/0081741 | A1* | 4/2005 | Fortuna ........................ | 105/280 |
| 2010/0251923 | A1* | 10/2010 | Forbes et al. ................. | 105/253 |
| 2015/0298709 | A1* | 10/2015 | Senn et al. | |

FOREIGN PATENT DOCUMENTS

| | | | |
|---|---|---|---|
| CN | 201728747 U | * | 2/2011 |
| CN | 201872969 U | * | 6/2011 |
| CN | 104526871 A | * | 4/2015 |
| RU | 2220861 C1 | * | 1/2004 |
| RU | 2265536 C2 | * | 12/2005 |

* cited by examiner

*Primary Examiner* — H Gutman
(74) *Attorney, Agent, or Firm* — Ryan W. Dupuis; Kyle R. Satlerthwaite; Ade & Company Inc.

(57) ABSTRACT

A bulk material transport apparatus which includes a containment structure on a wheeled frame which is formed of perimeter wall members about a bulk material containment area, further includes at least one modular hopper unit mountable at a bottom side of the containment area for discharging contents of the bulk material containment area therethrough. The modular hopper units can be readily interchanged with other hopper units which are different in gate opening size, gate opening height, gate opening orientation, and/or other characteristics relative to one another. One optional modular hopper unit is a side discharge unit which is reversible for discharging to a selected one of two laterally opposed sides of the transport apparatus.

11 Claims, 11 Drawing Sheets

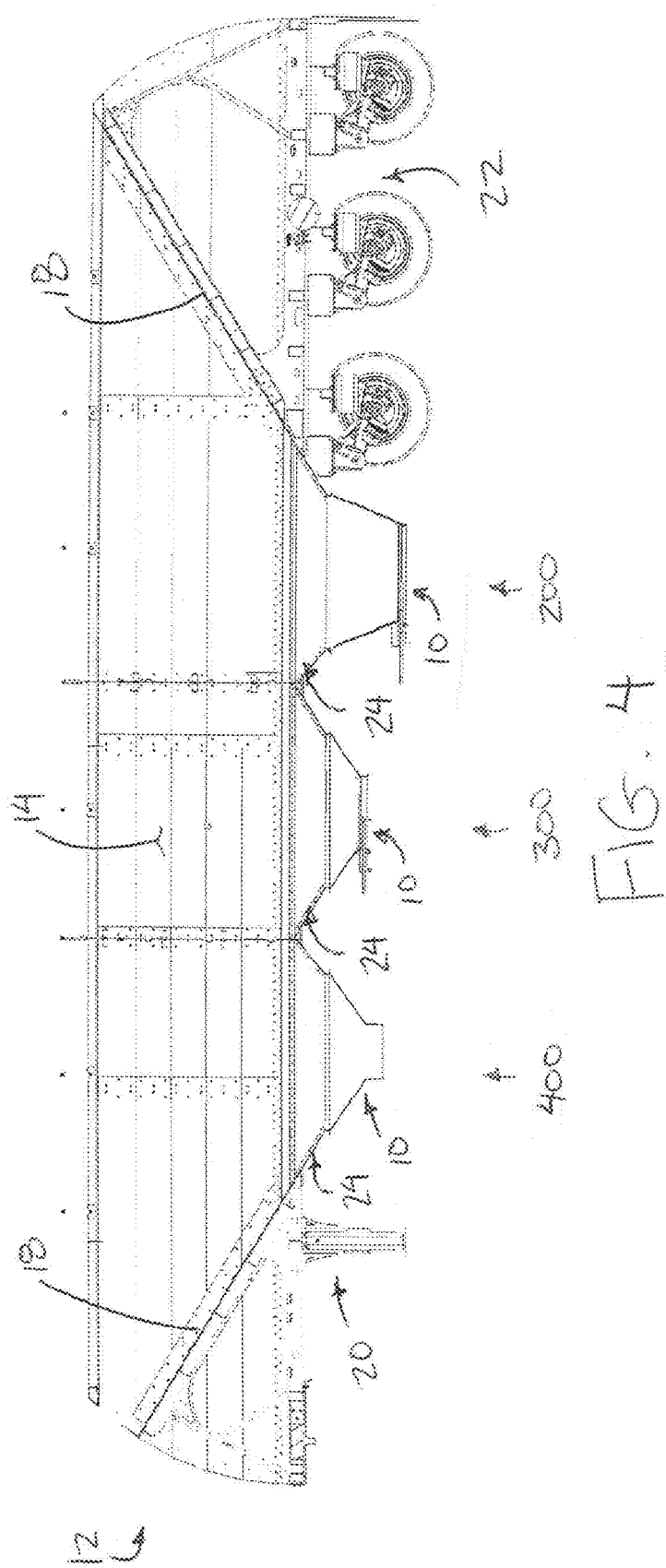

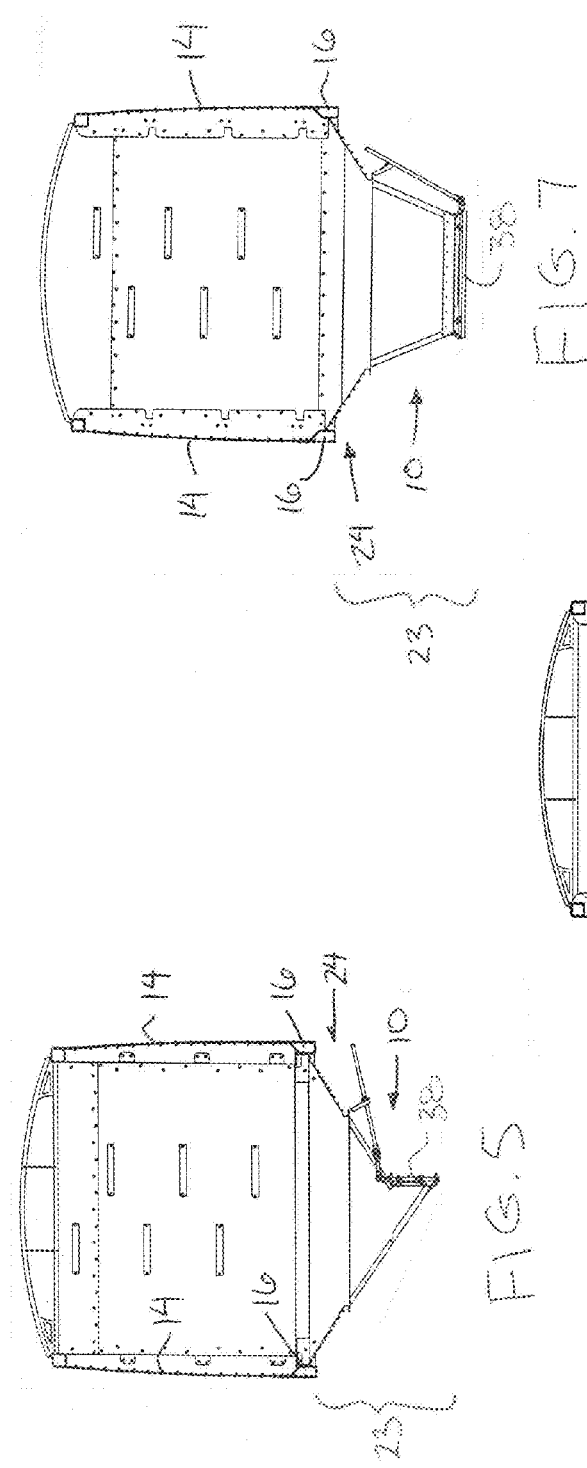

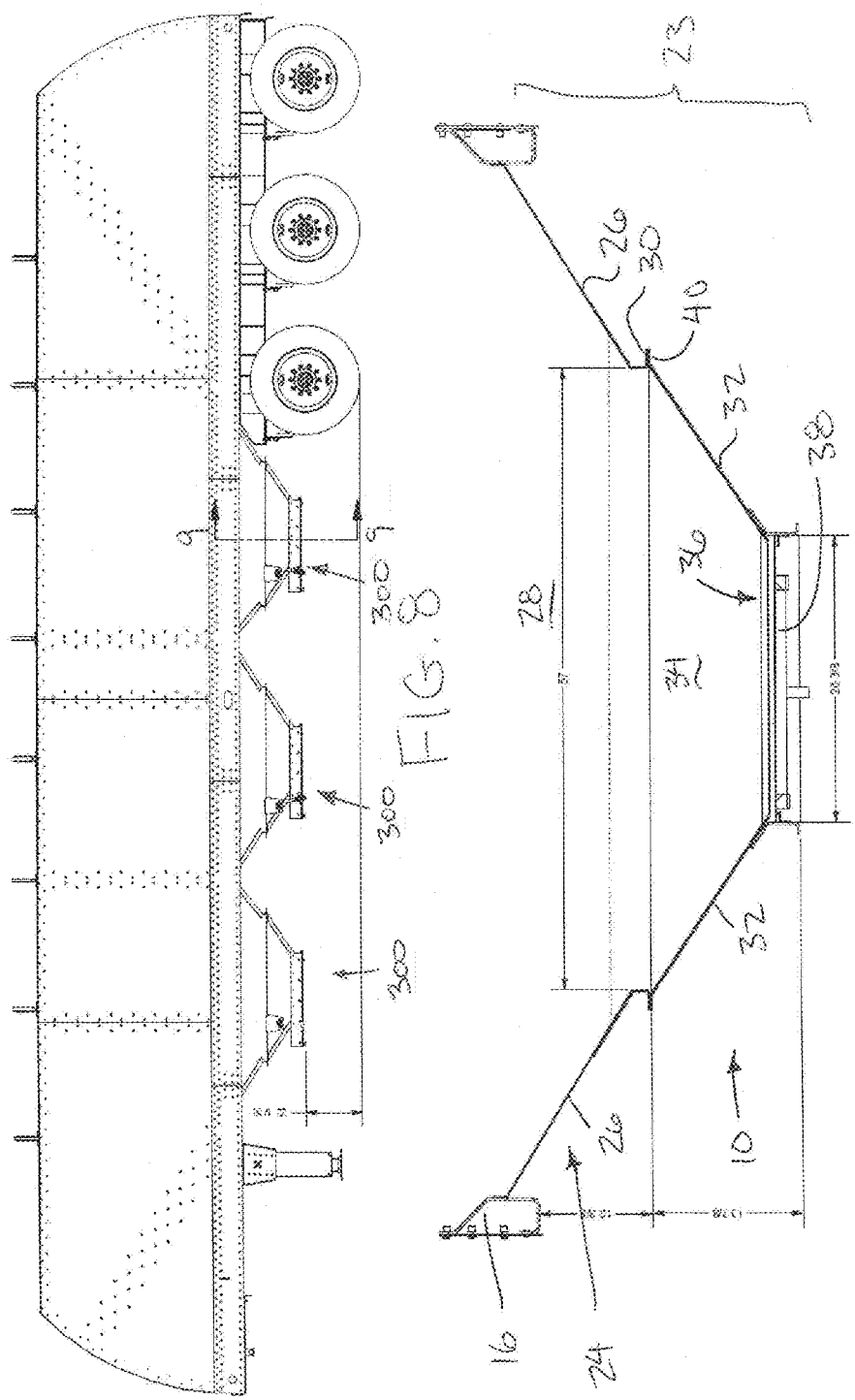

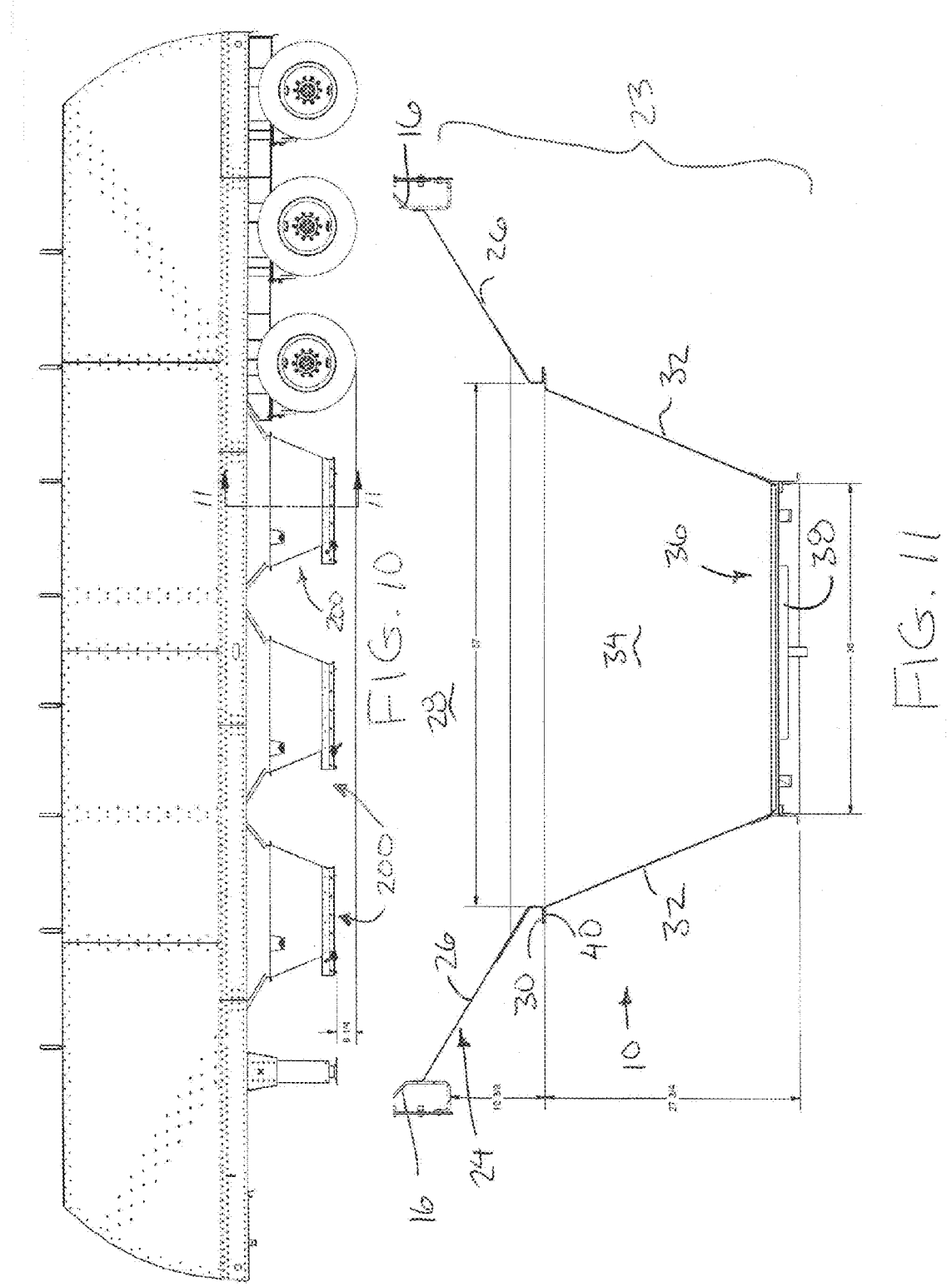

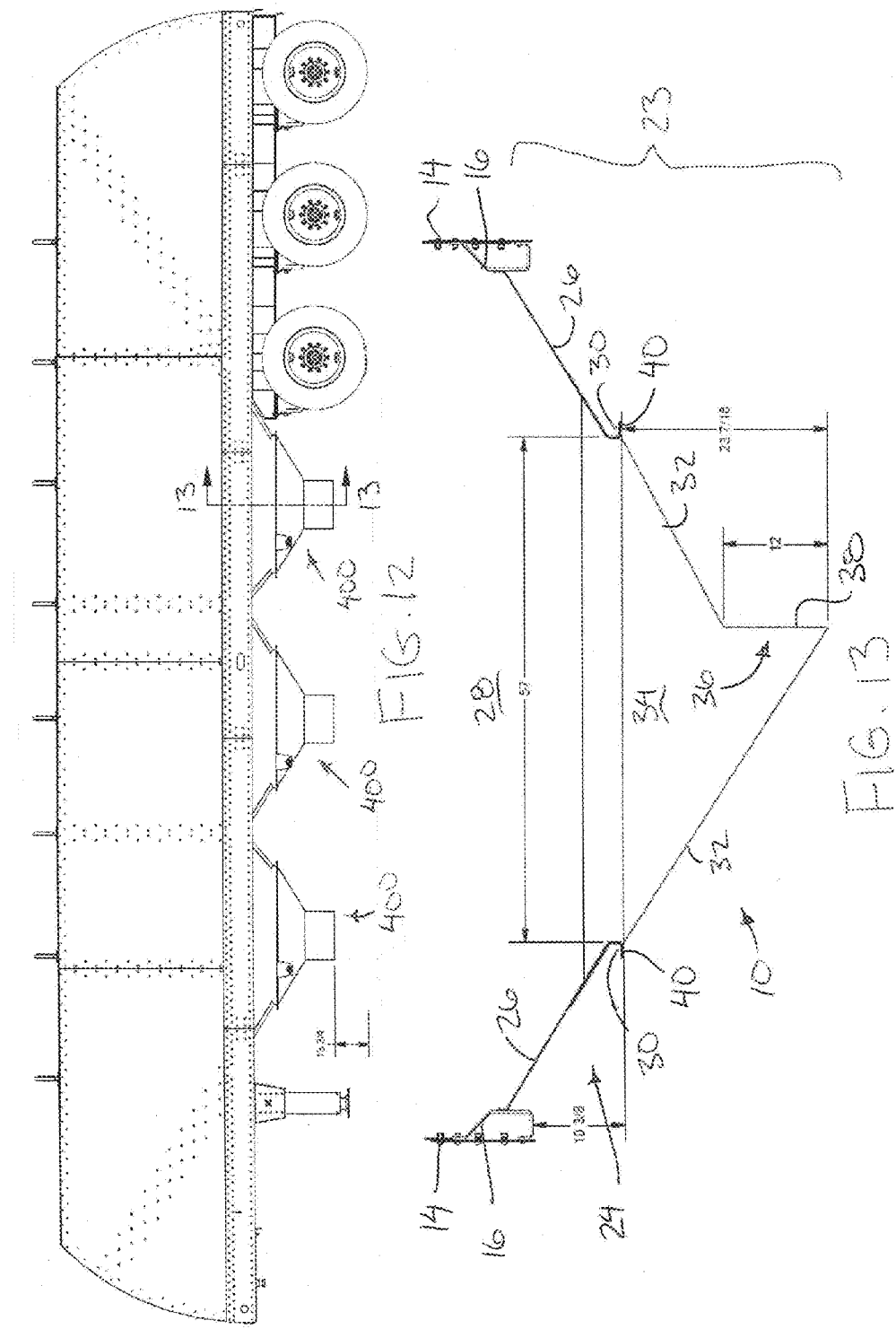

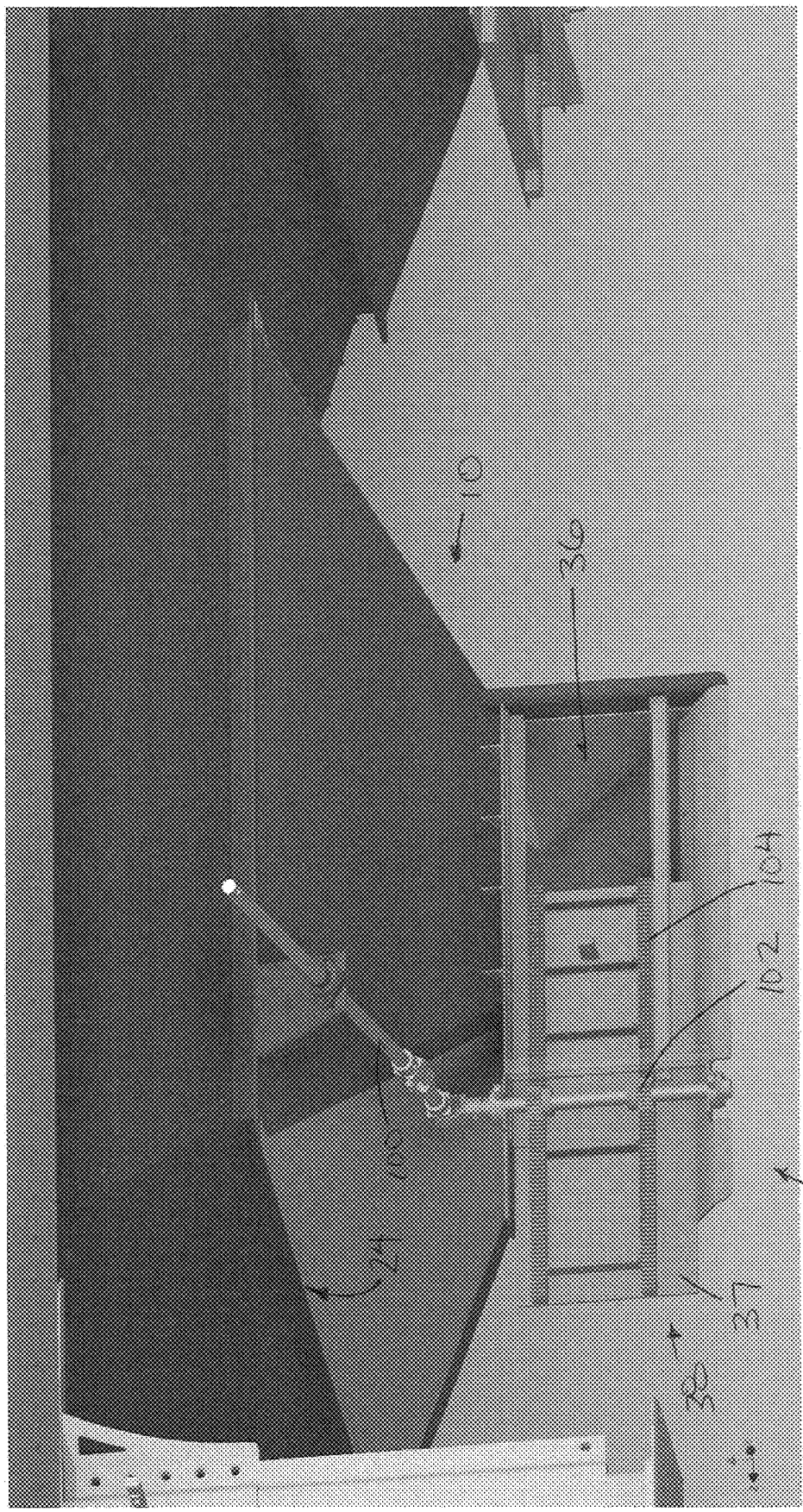

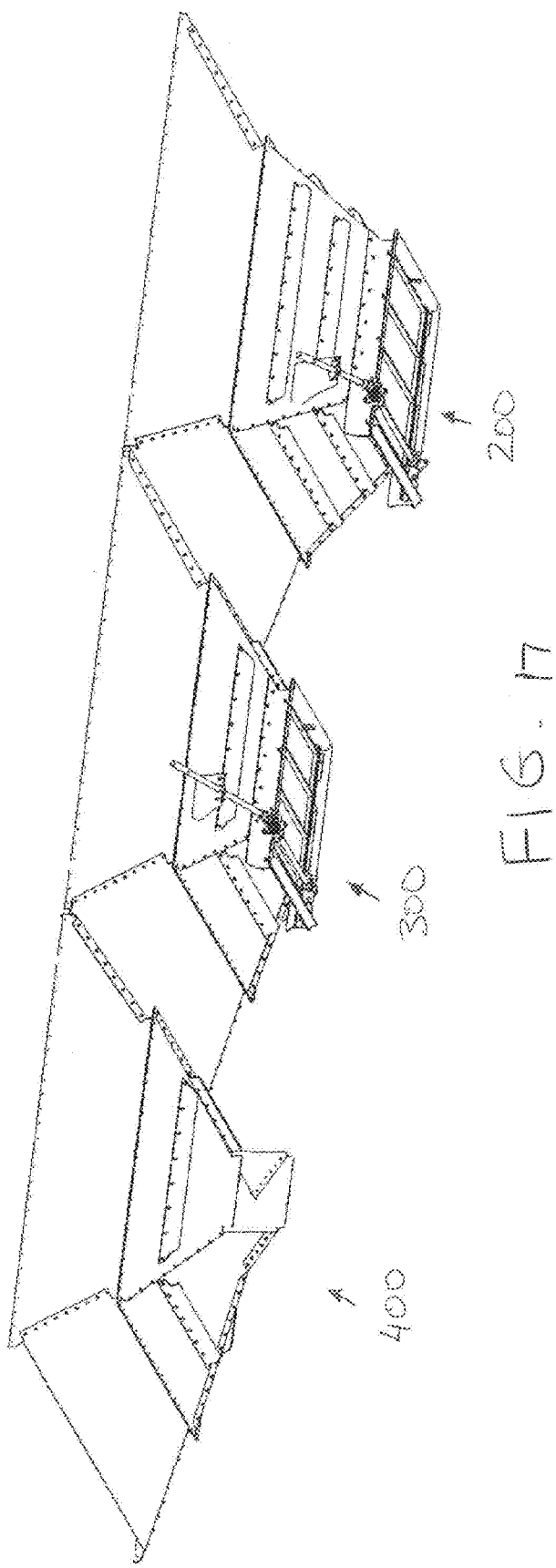

MODULAR HOPPER UNIT FOR BULK MATERIAL TRANSPORT TRUCK OR TRAILER

This application claims the benefit under 35 U.S.C. 119(e) of U.S. provisional application Ser. No. 61/819,149, filed May 3, 2013.

FIELD OF THE INVENTION

The present invention relates to a modular hopper unit for a bulk material transport apparatus, for example hopper trailers, belly dump trailers or any other type of truck or trailer that unloads/dumps the load (bulk product being hauled) thru an opening at the bottom of the trailer body by using gravity, air pressure or any type of conveyor or auger system to unload the trailer. These trailers are typically used (but not limited to), transporting agricultural products (for example grains and fertilizers), construction products (for example dirt, gravel, clay, and sand), as well as the transportation of any other bulk material products. The design of the modular hopper unit is such that it allows for a quick-exchange of the hopper unit for another hopper unit depending on what hopper style is needed for the bulk product being hauled and the type of unloading clearances and operation the product is being unloaded into or with. The modular hopper unit can be attached by using bolts, screws, any type of rivets, latches, spot welds or any other means which can be readily released at a later date to allow interchangeability of the hopper unit with other units of different configuration.

BACKGROUND

In agricultural transportation, hopper trailer customers/operators, can be divided in two main groups: Farmers and Commercial Haulers. The challenge that the trailer manufacturers face is that that each of these customer groups needs a trailer that fits their specific needs, and the needs of these two main customer groups regarding the trailer design and functionality, are different from each other. The 3 main parameters are i) loading capacity, ii) gate opening size, and iii) ground clearance, which influence each other in a negative way.

For the Farm operation the high ground clearance and the small gate opening has a higher priority than a high loading capacity. More particularly, farmers typically want significant clearance between the ground and the bottom of the hopper gate, and the gate opening should not exceed a certain size, for example approximately 24 inches by 24 inches. These parameters are needed in order to dump into the various types of receiving devices that they are unloading into such as augers, hoppers, elevator pits or conveyors to name a few. The gate opening can't be much bigger than 24 inches by 24 inches because most of the common conveyor belts and auger openings are within these dimensions. Another advantage for farmers in having the hoppers as high as possible is the better ground clearance to avoid trailer damage when driving thru the field or other rough terrain. This high ground clearance from the ground to the bottom of the hopper, and the small gate opening means a smaller hopper, which means less loading capacity, but this is a sacrifice they must make in order to have the clearance and smaller hopper openings.

What is an advantage for the farmer, however, is a disadvantage for the commercial hauler. The big clearance from the ground to the bottom of the hopper and the smaller gate means less loading capacity. For the commercial hauler, loading capacity has a higher priority than the ground clearance or hopper opening dimensions because they are typically hauling long distances on highways instead driving more frequently thru the field. Also the commercial hauler needs the gate opening as big as possible in order to unload with a higher speed. The priorities are the opposite of what the Farmer needs.

The different requirements of the two main customer groups are forcing trailer manufacturer to build two different trailers in order to satisfy both markets. In addition to this, users that are involved in both sectors often have to buy two different trailers. A used trailer will also only be attractive to the one customer group only.

SUMMARY OF THE INVENTION

According to one aspect of the invention there is provided a hopper bottom bulk material transport apparatus comprising:

a wheeled frame having side wall members and end wall members defining a bulk material containment area; and at least one modular hopper unit arranged to be supported on the wheeled frame at a bottom of the bulk material containment area so as to be arranged In this instance, a plurality of modular hopper units which are different in configuration from one another may be interchangeably supported at the bottom of the bulk material containment area. For example the modular hopper units may be different in height relative to one another, or have different gate opening sizes relative to one another.

According to a second aspect, there is provided in a hopper bottom bulk material transport apparatus comprising:

a wheeled frame;

a containment structure defining a bulk material containment area therein which is supported on the wheeled frame, the containment structure comprising:

a plurality of perimeter wall members disposed about a perimeter of the bulk material containment area; and at least one hopper assembly disposed at a bottom side of the bulk material containment area so as to be arranged for discharging contents of the bulk material containment area therethrough;

said at least one hopper assembly including a top end supported on the wheeled frame, a gate structure proximate a bottom end for selectively discharging contents of the bulk material containment are therethrough, and a plurality of wall portions tapering downwardly and inwardly towards one another from the top end to gate structure at the bottom end;

an improvement comprising said at least one hopper assembly comprising a modular hopper unit which includes the gate structure and at least some of the wall portions which are collectively separable from a remainder of the containment structure on the wheeled frame.

According to a third aspect of the present invention there is provided a modular hopper unit for use with a bulk material transport apparatus in which the bulk material transport apparatus includes a wheeled frame and a containment structure defining a bulk material containment area therein which is supported on the wheeled frame, the containment structure including a plurality of perimeter wall members disposed about a perimeter of the bulk material containment area, and a hopper support disposed at a bottom side of the bulk material containment area so as to be arranged for discharging contents of the bulk material containment area therethrough, the modular hopper unit comprising:

a plurality of wall portions extending downwardly and inwardly towards one another from a top end of the modular hopper unit to a gate opening at a bottom end of the modular hopper unit; and a gate structure supported on the bottom end of the modular hopper unit so as to be operable relative to the gate opening between open and closed conditions;

the top end of the modular hopper unit being mountable on a bottom end of the hopper support such that the modular hopper unit is arranged to receive bulk material discharged from the hopper support and such that the modular hopper unit is separable from the hopper support of the containment structure on the wheeled frame.

The modular hopper unit as described herein effectively permits trailer manufacturer to build a single trailer configuration which satisfies both the farmer and commercial hauler markets. In addition to this, users that are involved in both sectors can purchase a single trailer and modify the trailer configuration by interchanging the hopper units according to the desired use of the trailer. Furthermore, a used trailer can be modified to suit the needs of either farmers or commercial hauler marks such that the trailer can be resold to either customer group.

Preferably the wheeled frame described above comprises a highway transport trailer, however, in alternative embodiments, the wheeled frame may also comprise a truck frame.

Preferably the modular hopper unit of said at least one hopper assembly is secured relative to the remainder of the containment structure using fastener elements which are readily releasable.

When said at least one hopper assembly comprises a plurality of hopper assemblies, preferably the plurality of modular hopper units of the hopper assemblies are interchangeable with one another.

When an auxiliary hopper unit is provided which is different in configuration from the modular hopper unit of said at least one hopper assembly, preferably the auxiliary hopper unit and the modular unit are readily interchangeable with one another.

The auxiliary hopper unit and the modular hopper unit may be different in height relative to one another such that the gate structure of the auxiliary hopper unit and the gate structure of the modular hopper unit are arranged to be supported at different heights below the wheeled frame.

One of the auxiliary hopper unit and the modular hopper unit may have a gate structure including a generally horizontal gate opening, while another one of the auxiliary hopper unit and the modular hopper unit may have a gate structure including a generally upright gate opening.

The auxiliary hopper unit and the modular hopper unit may also have different gate opening sizes relative to one another, sloped wall portions at different inclinations relative to one another, different carrying capacity relative to one another, and/or different gate opening locations relative to one another.

In one embodiment, the modular hopper unit comprises a side discharge hopper unit having a gate opening which is oriented to discharge material therefrom in a lateral orientation to one side of the hopper unit. Preferably the side discharge hopper unit is mountable on the remainder of the containment structure in two diametrically opposing orientations which are rotated about a vertical axis relative to one another, and the gate opening is upright in orientation.

The modular hopper unit may be connected to the trailer at the top of the overall hopper assembly (which is substantially at or near the bottom of the sidewall of the containment area thereabove) such that substantially the entire hopper assembly forms the modular/interchangeable portion.

In the preferred embodiment, however, only a lower portion of the overall hopper assembly forms the modular hopper unit which is modular and interchangeable. In this instance, the wall portions of said at least one hopper assembly preferably comprise a plurality of upper wall portions defining a hopper support which is part of said remainder of the containment structure on the wheeled frame, and a plurality of lower wall portions extending downwardly from the upper wall portions to the gate structure such that the lower wall portions and the gate structure collectively define the modular hopper unit of the hopper assembly.

The upper wall portions of the hopper support may comprise two opposed side wall portions and two opposed end wall portions tapering downwardly and inwardly towards one another below the side wall members of the bulk material containment area.

Preferably the upper wall portions of the hopper support of said at least one hopper assembly taper downwardly and inwardly towards one another to respective bottom ends which lie in a generally common horizontal mounting plane.

The hopper support of said at least one hopper assembly may further comprises a peripheral mounting flange at a bottom end thereof. In this instance, the modular hopper unit preferably also includes a peripheral mounting flange at a top end thereof in which the peripheral mounting flanges of the hopper support and the modular hopper unit are selectively joined to one another in sealing engagement to support the modular hopper unit on the respective hopper support.

The modular hopper unit preferably comprises: i) two opposed side wall portions at opposing sides; and ii) two opposed end wall portions extending between the two side wall portions at opposing ends; in which: iii) the wall portions taper downwardly and inwardly towards one another from a top end to a bottom end; and iv) the gate structure comprises a slide gate operatively associated with a gate opening at the bottom end of the wall portions.

According to another aspect of the present invention there is provided a hopper unit for use with a bulk material transport apparatus in which the bulk material transport apparatus includes a wheeled frame and a containment structure defining a bulk material containment area therein which is supported on the wheeled frame, the containment structure including a plurality of perimeter wall members disposed about a perimeter of the bulk material containment area, and a hopper support disposed at a bottom side of the bulk material containment area so as to be arranged for discharging contents of the bulk material containment area therethrough, the hopper unit comprising:

a plurality of wall portions extending downwardly and inwardly towards one another from a top end of the hopper unit mountable on a bottom end of the hopper support such that the modular hopper unit is arranged to receive bulk material discharged from the hopper support to a gate opening at a bottom end of the hopper unit; and a gate structure supported on the bottom end of the hopper unit so as to be operable relative to the gate opening between open and closed conditions;

the gate opening being oriented to discharge material therefrom in a lateral orientation to one side of the hopper unit.

Preferably the top end of the hopper unit is mountable on the hopper support in two diametrically opposing orientations which are rotated about a vertical axis relative to one another.

Preferably the gate opening is upright in orientation.

The concept of the present invention is to have one trailer with several different types or dimensions of hoppers that can be attached or removed with an easy remove and replace procedure.

The connection can be (but is not limited to) a design which is as simple as a bolt-on process, or it may have some sort of sliding, swing in, over-center latches or a quick release mechanism of some type. Other attaching or joining technologies can also be used, but the focus of the invention is not the joining technology itself, but rather the idea of having a modular hopper that can easily be replaced with another hopper type, or when initially purchasing the trailer a hopper design can be chosen after the main trailer body has been built.

The detachable portion can be built in different variations such as different heights, various gate opening sizes, as well as different slope angles. Some additional options or features can be to have the hopper with an opening facing to the side of the trailer rather than out the bottom. This allows for a side discharge. Several different types of hoppers can be used on the trailer at the same time. This can be the case if a commercial hauler wants the hoppers as low as possible to gain capacity, but in doing so, the ground clearance becomes a problem. In this situation, a smaller hopper can be used on the center compartment of the trailer, while the larger and therefore bigger lower hoppers can be used at the front and back hopper positions on the trailer. The assumption is that on uneven ground, the center of the trailer has the highest risk of hitting the ground.

Every hopper type can be mounted in two different ways in order to enable operation of the hopper gates from either the driver side or the passenger side. This allows the customer to change the hopper orientation, by rotating the detachable portion 180 degrees.

Advantages for the manufacturer are that the manufacturer builds one type of trailer, and offers different types of hopper attachments that the customer/buyer can choose depending on his needs, equipment to be used in conjunction with the Trailer etc. Also the customization of a trailer is simpler, because only the modular and detachable portion of the hopper gets changed.

Advantages for user are that a trailer that was built initially as the farm version, can be easily modified to a commercial hauling use.

Various embodiments of the invention will now be described in conjunction with the accompanying drawings in which:

BRIEF DESCRIPTION OF THE DRAWINGS

FIG. 4 is a sectional view along the line 4-4 of FIG. 3;

FIG. 5 is a sectional view along the line 5-5 of FIG. 2;

FIG. 6 is a sectional view along the line 6-6 of FIG. 2;

FIG. 7 is a sectional view along the line 7-7 FIG. 2;

FIG. 8 is a side view of a trailer supporting three high clearance hopper units thereon;

FIG. 9 is a sectional view along the line 9-9 of FIG. 8;

FIG. 10 is a side view of a trailer supporting three high capacity hopper units thereon;

FIG. 11 is a sectional view along the line 11-11 of FIG. 10;

FIG. 12 is a side view of a trailer supporting three side discharge hopper units thereon;

FIG. 13 is a sectional view along the line 13-13 of FIG. 12;

FIG. 16 is a perspective view of the side discharge hopper unit; and

FIG. 17 is a perspective view of all three hopper units in accordance with the trailer of FIG. 1.

In the drawings like characters of reference indicate corresponding parts in the different figures.

DETAILED DESCRIPTION

Figure 1:
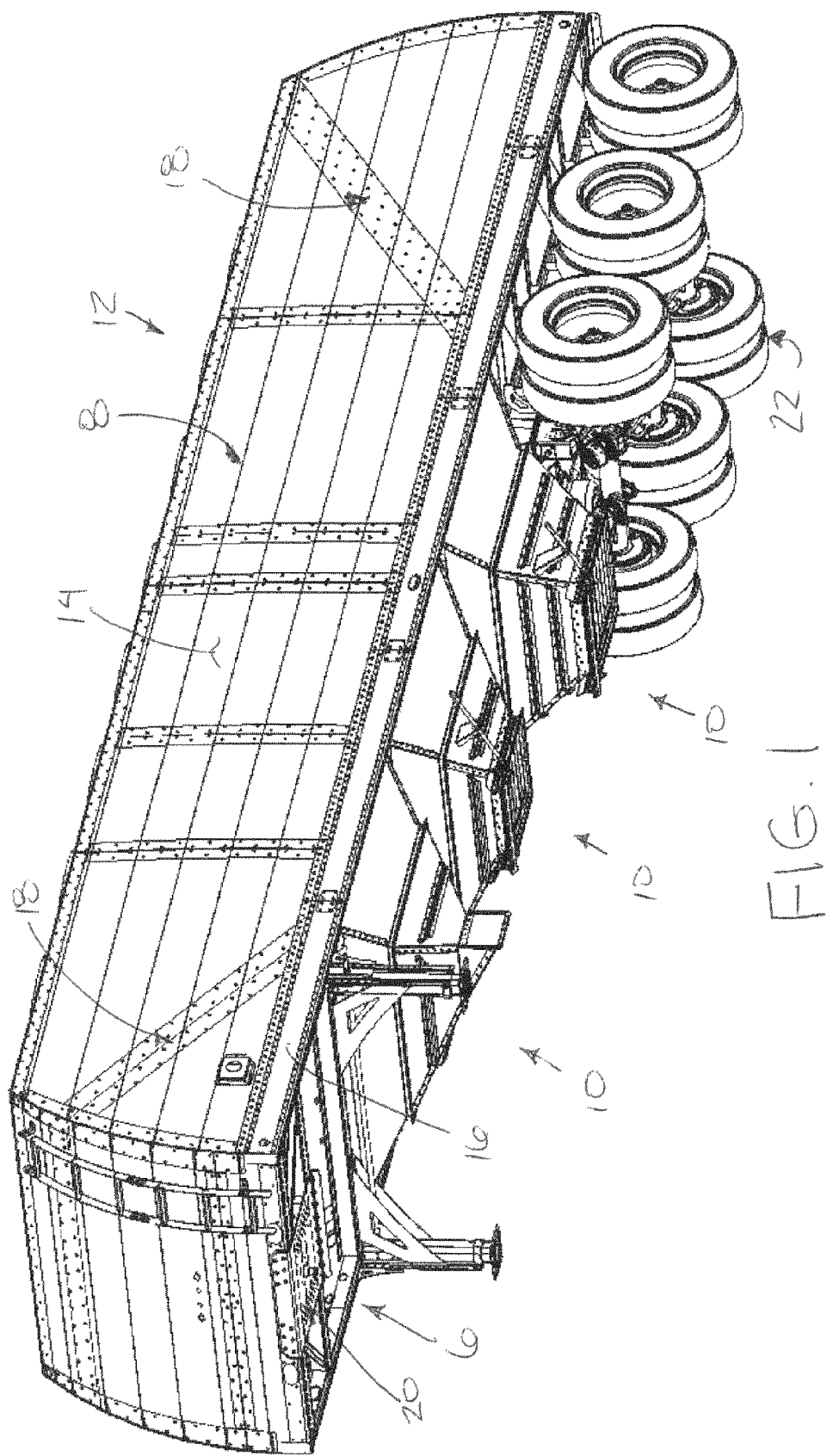
FIG. 1 is a perspective view of an exemplary transport trailer upon which various embodiments of the modular hopper units are supported.
Figure 2:
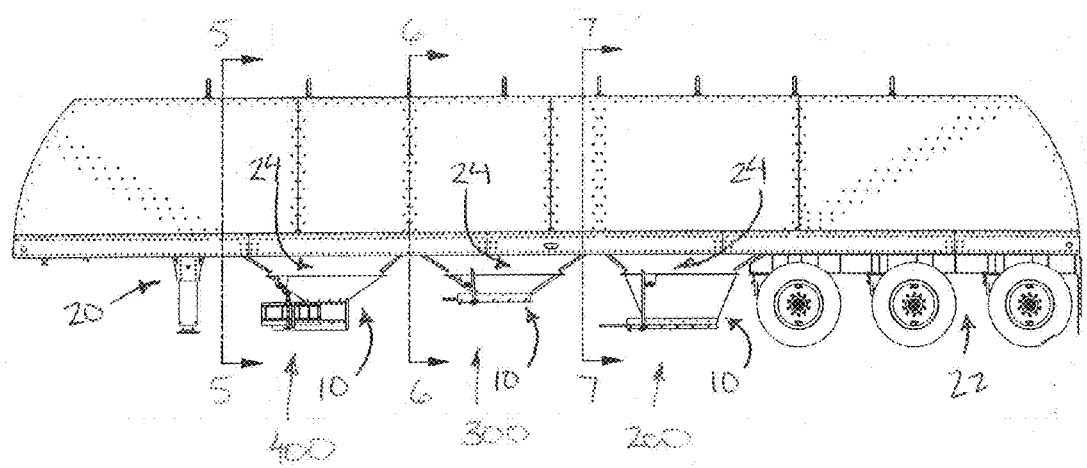
FIG. 2 is a side elevational view of the trailer according to FIG. 1.
Figure 3:
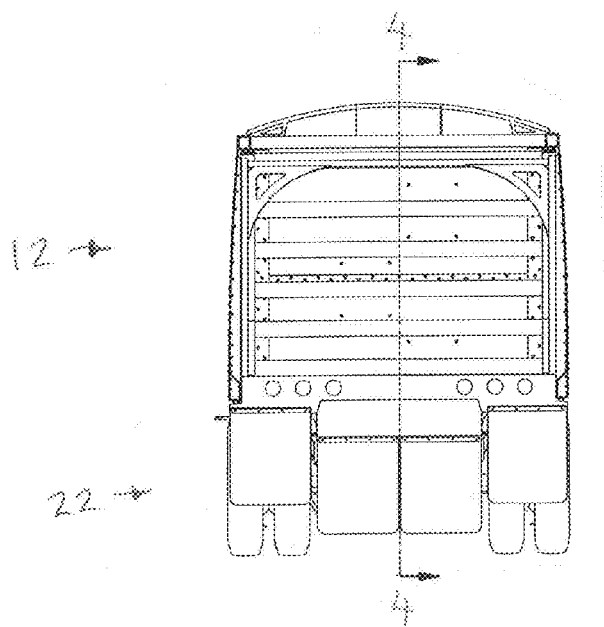
FIG. 3 is a rear end view of the trailer according to FIG. 1.

Referring to the accompanying figures there is illustrated a modular hopper unit generally indicated by reference numeral 10. Although various embodiments of the hopper unit 10 are illustrated in the accompanying figures, the common features of the various embodiments which first be described herein.

The hopper unit 10 is suitable for use with a hopper bottom bulk material transport apparatus, for example a highway transport trailer 12 in the illustrated embodiment. The trailer 12 generally includes a wheeled frame 6 supporting a containment structure 8 thereon which defines a bulk material containment area therein.

The containment structure 8 has two upright side wall members 14 extending longitudinally between the front and rear ends of the trailer so as to be substantially vertical and parallel to one another along laterally opposed sides of the containment area. The side wall members form two side rails 16 of the frame which span along the bottom sides of the side wall members respectively.

Two end wall members 18 are joined between the side wall members at longitudinally opposed front and rear ends of the trailer. The two end wall members are sloped downwardly and inwardly towards one another from the top end to the bottom end of a main bulk material containment area. The side wall members 14 and ends wall members 18 effectively define perimeter walls which fully surround the bulk material containment area about the full perimeter thereof for containing bulk material therein.

A hitching device 20 is mounted at the front end below the end wall member 18 at the front end for connection to a towing vehicle.

A rear wheel assembly 22 is mounted at the rear end below the end wall member 18 at the rear end.

The wheeled frame further comprises three hopper assemblies 23 which collectively span the bottom side of the containment area. The perimeter wall members thus extend generally upwardly from a full perimeter of the collective three hopper assemblies at the bottom side of the containment area. The three hopper assemblies 23 are thus disposed in series in the longitudinal direction of the trailer between the bottoms of the two end walls such that the three hopper assemblies collectively span the bottom of the bulk material containment area defined by the wall members thereabove.

In the illustrated embodiments, each hopper assembly 23 includes an upper portion in the form of a hopper support 24, and a lower portion which defines the modular hopper unit 10 which is selectively mounted on the respective hopper assembly 23 thereabove.

The overall hopper assembly 23 defined by a modular hopper unit 10 mounted on the bottom of a hopper support 24 which is fixed on the wheeled frame, includes a plurality of wall portions as described below which collectively taper downwardly and inwardly towards one another at laterally opposed sides and longitudinally opposed ends of the hopper assembly, from a top end of the hopper assembly fixed onto the wheeled frame as part of the overall containment structure to a bottom end locating a respective gate opening 36 of the overall hopper assembly.

A gate structure 38 is operatively supported on each modular hopper unit at the bottom end of the overall hopper assembly. The gate structure comprises a gate panel 37 which is supported on a pair of tracks so as to be slideable along the tracks in a plane of the gate opening 36 between a closed position fully spanning across and enclosing the gate opening, and an open position offset to one side of the opening such that the opening is substantially unobstructed by the gate panel.

The gate structure 38 may be manually operated between open and closed positions by a handle 100 rotatably supported on a wall portion of the modular hopper unit and which rotates a drive gear 102. The drive gear 102 is also rotatably supported on a wall portion of the modular hopper unit and is in meshing engagement which a rack of teeth 104 on the gate panel to operate the gate panel between open and closed positions by rotation of the handle 100.

Each hopper support 24 is fixed to the side rails 16 at opposing sides thereof to extend downwardly below the wall members. Each hopper support 24 is arranged to selectively mount a respective one of the modular hopper unit 10 thereon.

Each hopper support 24 comprises two opposed side wall portions 26 and two opposed end wall portions 28 tapering downwardly and inwardly towards one another below the side wall members of the bulk material containment area. The bottom ends of the upper wall portions 26 and 28 terminate in a common horizontal plane defining a discharge opening through which bulk material from the containment area thereabove is discharged to the respective modular hopper unit therebelow. A peripheral mounting flange 30 is supported at the bottom ends of the upper wall portions of the hopper support about the full circumference of the horizontal discharge opening of the hopper support 24.

Each modular hopper unit 10 similarly comprises two opposed side wall portions 32 and two opposed end wall portions 34 extending between the two side wall portions at opposing ends. The wall portions of each hopper unit similarly taper downwardly and inwardly towards one another from a top end to a bottom end locating a gate opening 36 of the hopper unit. The slide gate structure 38 is operatively associated with the gate opening at the bottom end of the wall portions to open and close the opening.

Each modular hopper unit also includes peripheral mounting flange 40 which projects horizontally outward from the top end of the wall portions about the full circumference of the hopper unit. The mounting flanges of the hopper support and the modular hopper unit are joined to one another to support the modular hopper unit on the respective hopper support by various means to permit the modular hopper unit to be readily separated and interchanged with a different configuration of hopper unit as desired. More particularly, the mounting flanges may be secured to one another by bolts, screws, rivets, latches, or welds for example, such that the modular hopper unit may remain readily separable from the wheeled frame for interchanging with a different hopper unit of different configuration if desired.

In some instances, the interchangeable hopper units may be different in height relative to one another, may have different gate opening sizes relative to one another, may have different holding capacity, or any combination thereof.

Figure 14:
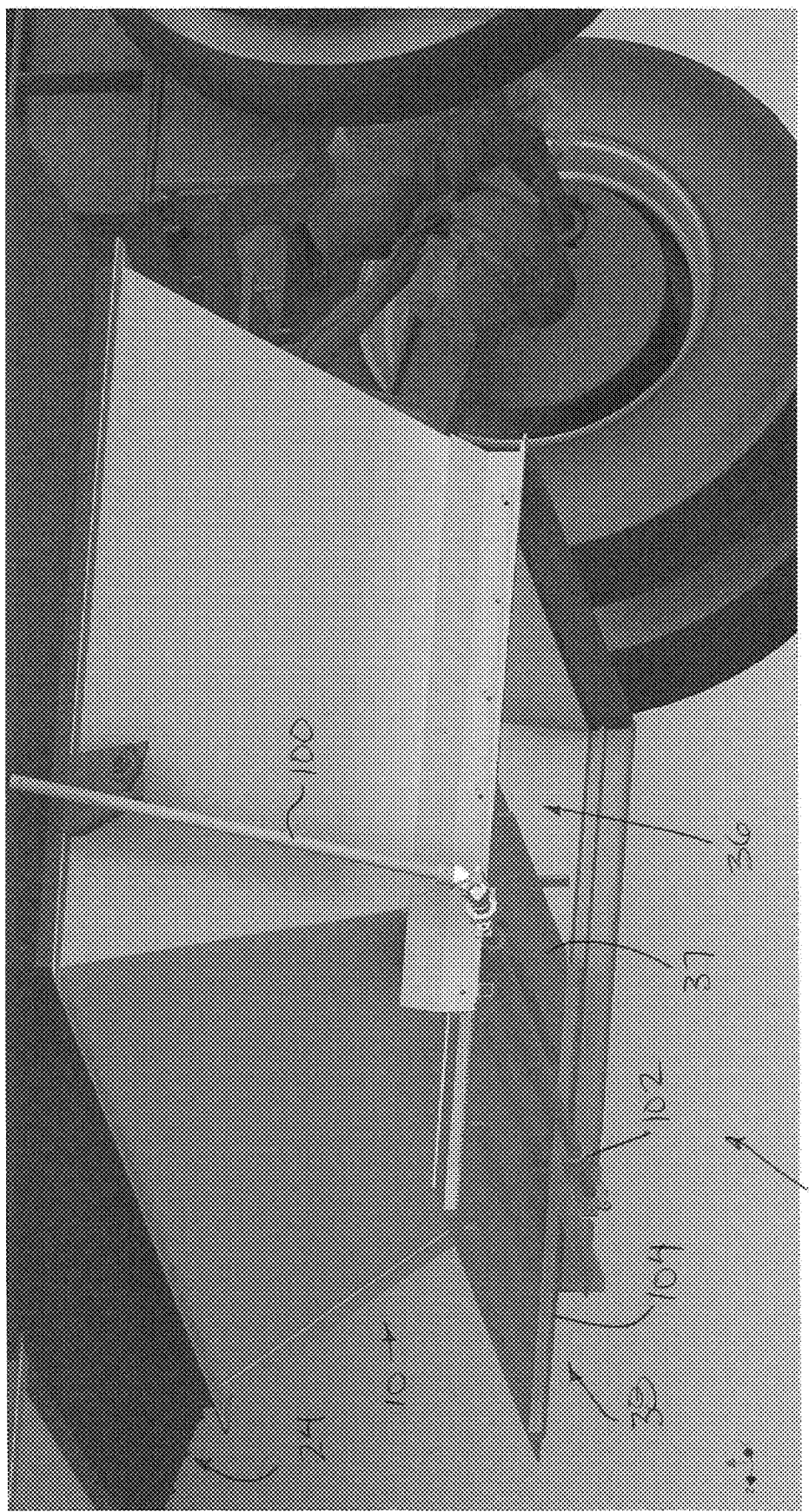
FIG. 14 is a perspective view of the high capacity hopper unit.
Figure 15:
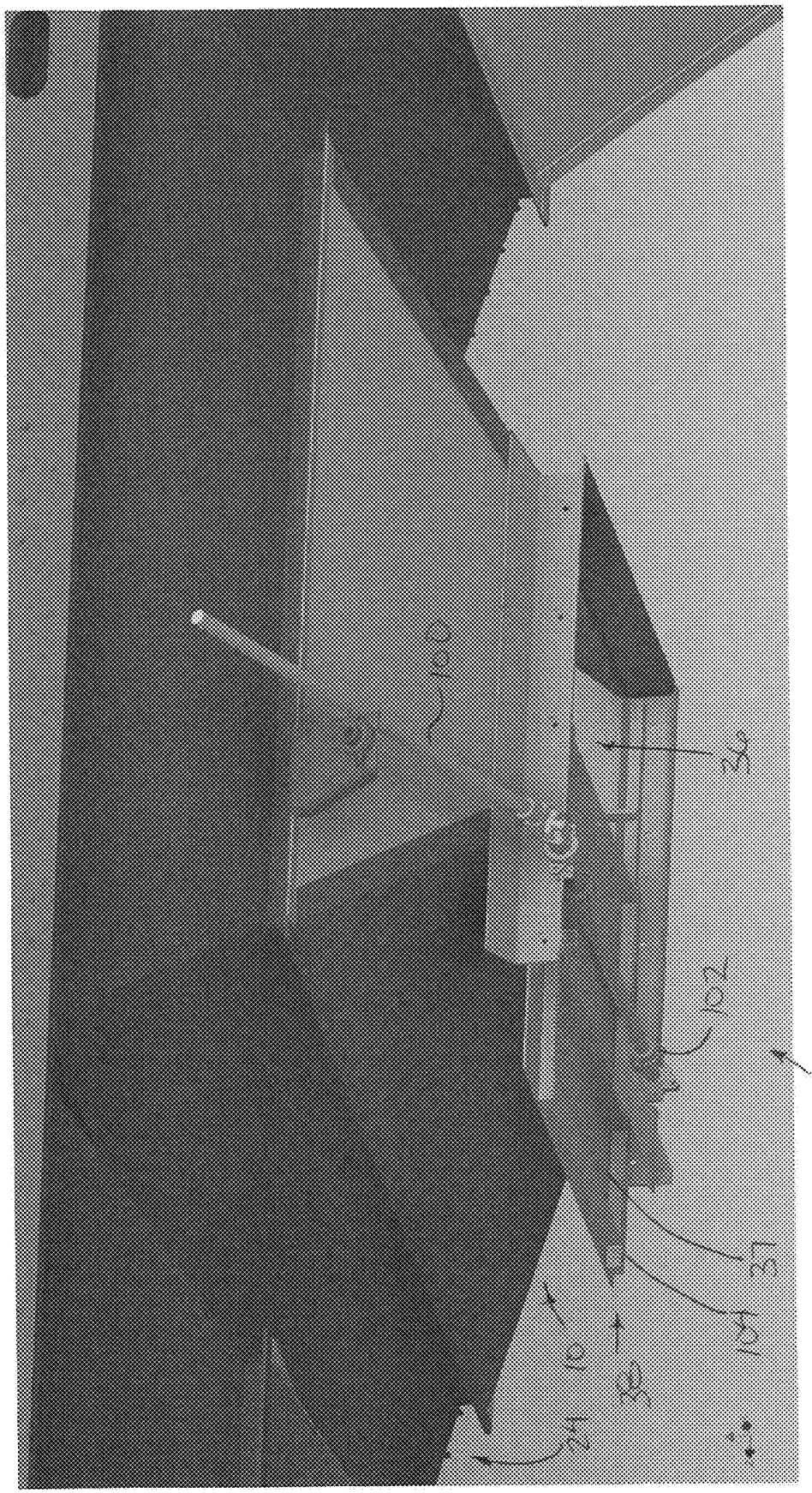
FIG. 15 is a perspective view of the high clearance hopper unit.

In the accompanying figures, three examples of hopper units 10 are provided. The three examples include a high capacity unit 200, a high clearance unit 300, and a side discharge unit 400. The three units are shown in further detail in FIGS. 14, 15 and 16 respectively. Although the inclination, size, orientation, and general configuration of the upper wall portions of the hopper supports remain fixed and identical to one another, the different hopper unit types 10 have characteristics which differ from one another as described in the following.

The trailer illustrated in FIGS. 1 through 7 is shown with one of each exemplary type of unit 200, 300 and 400 supported thereon, although in practice, a trailer is typically provided with three units which are identical in configuration to one another. The units are also symmetrical about a vertical plane which is oriented in the longitudinal direction of the trailer at a lateral center of the trailer. In this manner, the units can all be interchanged with one another on different hopper supports, and each unit can be mounted in two diametrically/laterally opposing orientations which are rotated 180 degrees about a vertical axis relative to one another. The units can thus be provided with a single gate actuator handle 100 offset laterally to one side of the unit with the user selecting which side of the trailer unit they would like the handles to be located by selecting which of the two diametrically opposed mounting locations is preferred.

As shown in FIG. 8, the exemplary trailer includes three high clearance hoppers 300 thereon. The lower wall portions of the high clearance hoppers are inclined downwardly and inwardly at substantially the same inclination as the upper wall portions of the corresponding hopper supports thereabove. The gate opening size has lateral and longitudinal dimensions which are approximately 24 inches or less to permit discharging to the intake of various agricultural equipment without spillage. The overall height of the lower wall portions in the units 300 is less than the corresponding lower wall portions of the units 200 so that the gate structures supported on the horizontal gate openings are greater in elevation and provide greater clearance relative to the ground than the units 300.

As shown in FIG. 9, the exemplary trailer includes three high capacity hoppers 200 thereon. The lower wall portions of the high capacity hopper units span a greater vertical distance between top and bottom edges thereof at a more vertical orientation than the corresponding wall portions of the high clearance units such that the resulting gate opening is horizontal like the high clearance units, but at a lower elevational due to the greater height of the units 200 compared to units 300. The gate opening size and corresponding gate panel size in the units 200 also have greater lateral and longitudinal dimensions than the corresponding dimensions of the units 300 to allow faster discharge.

In both units 200 and 300 the horizontal gate opening at the bottom side of the hopper unit is centered both laterally and horizontally.

As shown in FIG. 10, the exemplary trailer includes three side discharge units 400 thereon. The side discharge hopper unit 400 has a gate opening 36 which is offset to one side in the lateral direction of the trailer. More particularly, the gate opening is oriented to discharge material therefrom in a lateral orientation to one side of the hopper unit by being oriented in a generally upright orientation. In the illustrated embodiment the gate opening and gate panel lie in a vertical plane oriented in the longitudinal direction of the trailer. The side discharge hopper unit is arranged for mounting in two diametrically opposing orientations to allow for left side or right side discharging from the trailer as preferred by the user.

The actuator handle 100 is located on the same side of the unit that the gate opening discharges to.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. In a hopper bottom bulk material transport apparatus comprising:
    a wheeled frame;
    a containment structure defining a bulk material containment area therein which is supported on the wheeled frame, the containment structure comprising:
        a plurality of perimeter wall members disposed about a perimeter of the bulk material containment area; and
        at least one hopper assembly disposed at a bottom side of the bulk material containment area so as to be arranged for discharging contents of the bulk material containment area therethrough;
        said at least one hopper assembly including a top end supported on the wheeled frame, a gate structure proximate a bottom end for selectively discharging contents of the bulk material containment are therethrough, and a plurality of wall portions tapering downwardly and inwardly towards one another from the top end to gate structure at the bottom end;
    an improvement comprising said at least one hopper assembly comprising a modular hopper unit which includes the gate structure and at least some of the wall portions which are collectively separable from a remainder of the containment structure on the wheeled frame; and
    an auxiliary hopper unit associated with said at least one hopper assembly in which the auxiliary hopper unit and the modular unit are readily interchangeable with one another relative to the remainder of the containment structure;
    the auxiliary hopper unit and the modular hopper unit being different in height relative to one another such that the gate structure of the auxiliary hopper unit and the gate structure of the modular hopper unit are arranged to be supported at different heights below the wheeled frame.

2. The improvement according to claim 1 wherein the wheeled frame comprises a highway transport trailer.

3. The improvement according to claim 1 wherein the wheeled frame comprises a truck frame.

4. The improvement according to claim 1 wherein the modular hopper unit of said at least one hopper assembly is secured relative to the remainder of the containment structure using securing elements which are readily releasable.

5. The improvement according to claim 1 wherein said at least one hopper assembly comprises a plurality of hopper assemblies, and wherein the plurality of modular hopper units of the hopper assemblies are interchangeable with one another.

6. The improvement according to claim 1 wherein the auxiliary hopper unit and the modular hopper unit have different gate opening sizes relative to one another.

7. The improvement according to claim 1 wherein the wall portions of said at least one hopper assembly comprises a plurality of upper wall portions defining a hopper support which is part of said remainder of the containment structure on the wheeled frame, and a plurality of lower wall portions extending downwardly from the upper wall portions to the gate structure such that the lower wall portions and the gate structure collectively define the modular hopper unit of the hopper assembly.

8. The improvement according to claim 7 wherein the upper wall portions of the hopper support comprise two opposed side wall portions and two opposed end wall portions tapering downwardly and inwardly towards one another below the side wall members of the bulk material containment area.

9. The improvement according to claim 7 wherein the upper wall portions of the hopper support of said at least one hopper assembly taper downwardly and inwardly towards one another to respective bottom ends which lie in a generally common horizontal mounting plane.

10. The improvement according to claim 7 wherein the hopper support of said at least one hopper assembly further comprises a peripheral mounting flange at a bottom end thereof and the modular hopper unit includes a peripheral mounting flange at a top end thereof, the peripheral mounting flanges of the hopper support and the modular hopper unit being selectively joined to one another to support the modular hopper unit on the respective hopper support.

11. The improvement according to claim 1 wherein the modular hopper unit comprises:
    two opposed side wall portions at opposing sides; and
    two opposed end wall portions extending between the two side wall portions at opposing ends;
    the wall portions tapering downwardly and inwardly towards one another from a top end to a bottom end; and
    the gate structure comprising a slide gate operatively associated with a gate opening at the bottom end of the wall portions.

* * * * *